(12) United States Patent
Han et al.

(10) Patent No.: US 9,937,770 B2
(45) Date of Patent: Apr. 10, 2018

(54) METHOD FOR CONTROLLING AIR FLOW FOR VEHICLE

(71) Applicant: Hyundai Motor Company, Seoul (KR)

(72) Inventors: Kwang Ok Han, Seoul (KR); Yong Chul Kim, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/932,201

(22) Filed: Nov. 4, 2015

(65) Prior Publication Data

US 2016/0347148 A1 Dec. 1, 2016

(30) Foreign Application Priority Data

May 26, 2015 (KR) ........................ 10-2015-0072938

(51) Int. Cl.
*B60H 1/00* (2006.01)
*B60K 35/00* (2006.01)
*B60K 37/06* (2006.01)
*B60R 25/00* (2013.01)

(52) U.S. Cl.
CPC ......... *B60H 1/00642* (2013.01); *B60K 35/00* (2013.01); *B60K 37/06* (2013.01); *B60K 2350/1008* (2013.01); *B60K 2350/1024* (2013.01); *B60R 25/00* (2013.01)

(58) Field of Classification Search
CPC ............................ B60H 1/004; B60H 1/00064; B60H 1/00742; B60H 1/00764; B60H 1/00785; B60H 1/00857; B60H 1/2218; B60K 6/48; B60K 35/00; B60R 16/0231; B60R 16/0315; B60R 25/00; B60R 25/2081; B60R 25/241; B60W 30/06; B60W 50/14; B60Y 2400/214; G01C 21/26; G01C 21/3694; G08G 1/0969; H04H 60/47; H04H 60/51; Y10S 367/909; Y10S 715/97
USPC ............ 701/1, 22, 36, 41, 102, 113; 62/298; 165/204
See application file for complete search history.

(56) References Cited

U.S. PATENT DOCUMENTS 4,961,462 A * 10/1990 Iida ...................... B60H 1/0075
165/204
5,638,276 A * 6/1997 Hart ...................... B60T 13/665
246/182 B (Continued)

FOREIGN PATENT DOCUMENTS

JP 5-221228 A 8/1993
JP 2010-126136 A 6/2010

(Continued)

*Primary Examiner* — Anne M Antonucci
*Assistant Examiner* — Sanjeev Malhotra
(74) *Attorney, Agent, or Firm* — Morgan, Lewis & Bockius LLP

(57) ABSTRACT

A method for controlling an air flow for a vehicle may include mode selecting, that includes an input portion receiving an input for selecting at least any one of a plurality of discharging modes provided so as to select a discharge pattern of air discharged to the inside of the vehicle and an air flow controller determining the discharge mode, and air volume selecting, that includes the input portion receiving an input for selecting an air volume in the determined discharging mode after the discharging mode is determined and the air flow controller determining the air volume.

7 Claims, 3 Drawing Sheets

(56) References Cited

U.S. PATENT DOCUMENTS

| | | | | |
|---|---|---|---|---|
| 2007/0112476 | A1* | 5/2007 | Obradovich | B60R 16/0231 701/1 |
| 2008/0016897 | A1* | 1/2008 | Yasutomi | F24F 1/0007 62/298 |
| 2010/0194355 | A1* | 8/2010 | Wada | B60L 11/12 322/22 |
| 2010/0262351 | A1* | 10/2010 | Nagashima | F02D 9/02 701/102 |
| 2012/0292945 | A1* | 11/2012 | Nusbaum | B62D 35/001 296/180.4 |
| 2013/0332013 | A1* | 12/2013 | Malone | B60H 1/004 701/22 |
| 2014/0032048 | A1* | 1/2014 | Obradovich | B60R 16/0231 701/41 |
| 2014/0136087 | A1* | 5/2014 | Kamatani | F02D 29/02 701/113 |
| 2014/0229059 | A1* | 8/2014 | Surnilla | B60H 1/00742 701/36 |
| 2016/0167477 | A1* | 6/2016 | Kang | B60H 1/00064 165/204 |

FOREIGN PATENT DOCUMENTS

| | | |
|---|---|---|
| KR | 1997-0000652 A | 1/1997 |
| KR | 10-2006-0031084 A | 4/2006 |
| KR | 10-2011-0126264 A | 11/2011 |
| KR | 10-2012-0085419 A | 8/2012 |
| KR | 10-2013-0107419 A | 10/2013 |

\* cited by examiner

METHOD FOR CONTROLLING AIR FLOW FOR VEHICLE

CROSS REFERENCE TO RELATED APPLICATION

The present application claims priority to Korean Patent Application No. 10-2015-0072938 filed May 26, 2015, the entire contents of which is incorporated herein for all purposes by this reference.

BACKGROUND OF THE INVENTION

Field of the Invention

The present invention relates to a method for controlling an air flow for a vehicle, and more particularly, to a method for controlling an air flow for a vehicle capable of setting a form and strength of an air volume.

Description of Related Art

An indoor air flow system of a vehicle has various setting modes in order to maintain a pleasant indoor air state. For example, there are an automatic mode in which a temperature is set depending on selection of a driver and a temperature, an air volume, and the like, of an air flow discharged from a blower are determined depending on the set temperature, a manual mode in which a temperature, an air volume, and the like, of an air flow discharged from the blower are determined by a manual manipulation of the driver, and the like.

The driver may select an air volume of air discharged to the inside of the vehicle using a manipulation button depending on his/her taste. The driver may perform a manipulation of increasing strength of the air volume and setting a temperature to be low in order to rapidly lower an indoor temperature in a state in which the indoor temperature is raised, such as summer.

However, the air flow system according to the related art described above cannot but perform only selection of an air volume and a temperature depending on selection of a user, and may not change a flow form of discharged air, and the like.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an air flow for a vehicle capable of selecting an air volume and setting a form of a discharged air flow.

According to various aspects of the present invention, a method for controlling an air flow for a vehicle may include mode selecting, that includes an input portion receiving an input for selecting at least any one of a plurality of discharging modes provided so as to select a discharge pattern of air discharged to the inside of the vehicle and an air flow controller determining the discharge mode, and air volume selecting, that includes the input portion receiving an input for selecting an air volume in the determined discharging mode after the discharging mode is determined and the air flow controller determining the air volume.

The method for controlling the air flow for the vehicle may further comprising starting, that includes the air flow controller generating a mode selection starting signal so as to enter the mode selecting step.

In the starting, in a case in which both of an air volume increase button signal and an air volume decrease button signal of the input portion of the vehicle are generated in a set time range, the mode selection starting signal may be generated by the air flow controller.

The method for controlling the air flow for the vehicle may further include mode selection confirming, that includes the air flow controller controlling an air volume signal of an air volume display to be turned on or off at a time of the generation of the mode selection starting signal.

The plurality of discharging modes set in the mode selecting step may include a first mode in which an air volume increase width has a constant gradient at a time of an increase in an air volume, a second mode in which an air volume increase width has a gradually increased gradient at the time of an increase in an air volume, and a third mode in which an air volume increase width has a gradually decreased gradient at the time of an increase in an air volume.

In the mode selecting, the discharging modes may be sequentially selected when an air volume increase button signal or an air volume decrease button signal of the input portion of the vehicle may be applied.

When a set time elapses after the discharging mode is selected in the mode selecting, the selected discharging mode may be determined by include air volume resetting, that includes the air flow controller resetting an air volume actually discharged in each air volume stage depending on the selected discharging mode.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
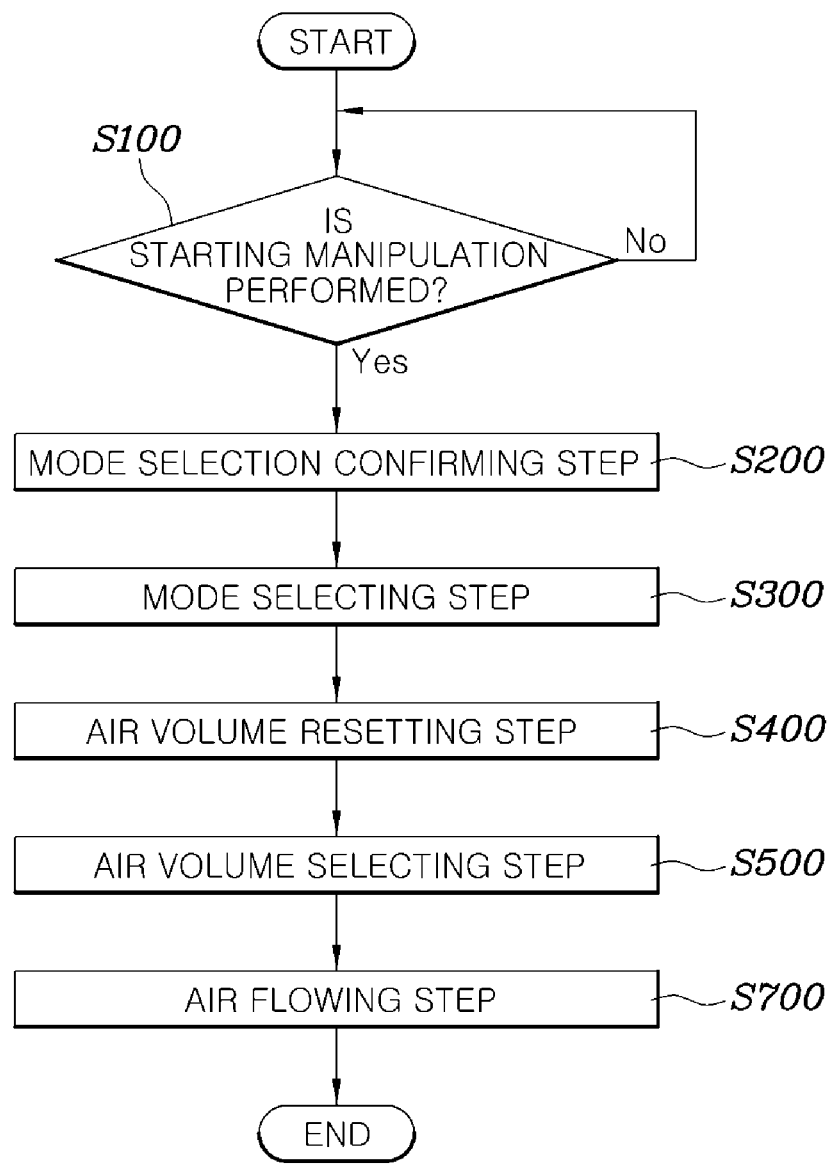
FIG. 1 is a flow chart of an exemplary method for controlling an air flow for a vehicle according to the present invention.
Figure 2:
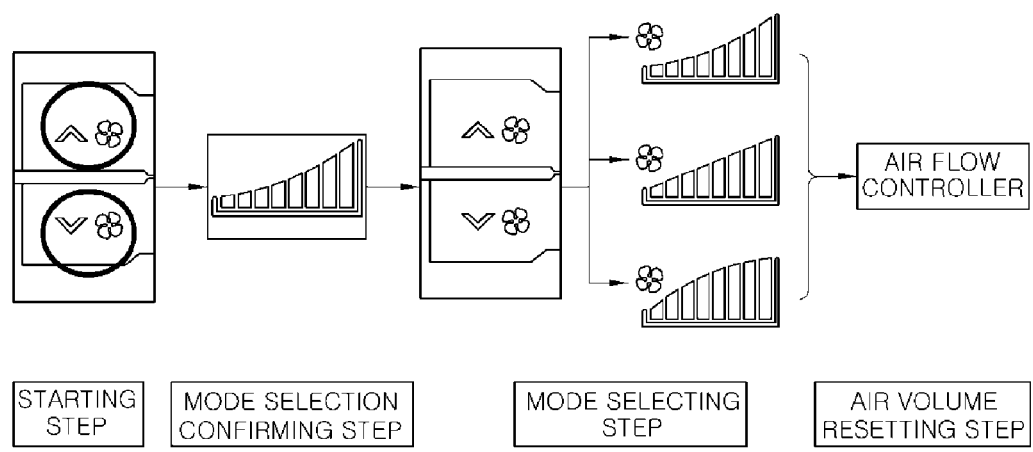
FIG. 2 is a view schematically illustrating the flow chart of FIG. 1.
Figure 3:
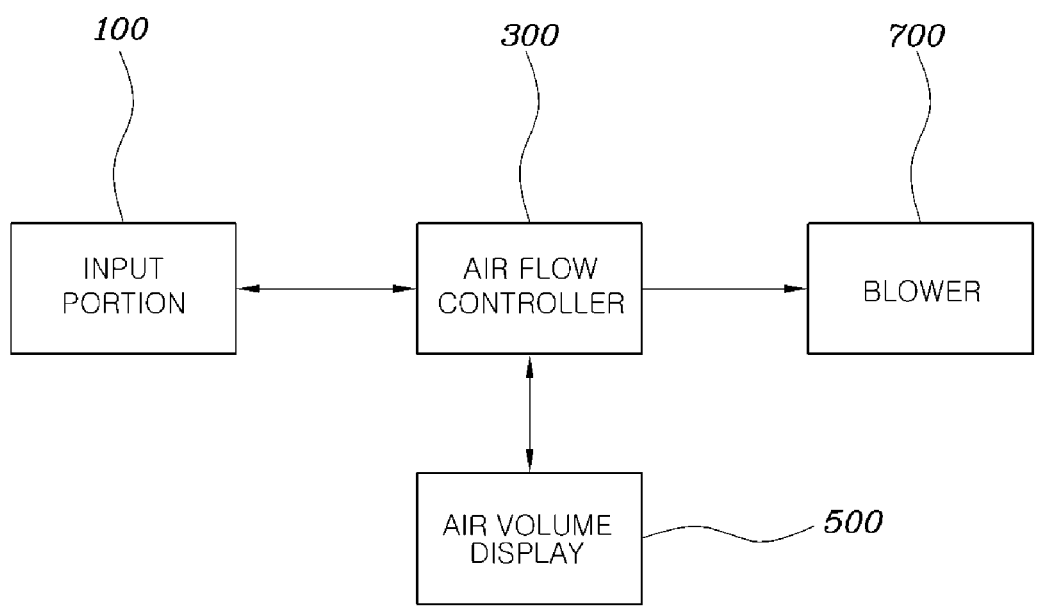
FIG. 3 is a view schematically illustrating an air flow system to which an exemplary method for controlling an air flow for a vehicle according to the present invention is applied.

FIG. 1 is a flow chart of a method for controlling an air flow for a vehicle according to various embodiments of the present invention, FIG. 2 is a view schematically illustrating the flow chart of FIG. 1, and FIG. 3 is a view schematically illustrating an air flow system to which a method for controlling an air flow for a vehicle according to various embodiments of the present invention is applied. The method for controlling an air flow for a vehicle according to various embodiments of the present invention may include a mode selecting step (S300) that an input portion 100 receives an input for selecting at least any one of a plurality of discharging modes provided so as to select a discharge pattern of air discharged to the inside of the vehicle and an air flow controller 300 determines the discharge mode, and an air volume selecting step (S500) that the input portion 100 receives an input for selecting an air volume in the determined discharging mode after the discharging mode is determined and the air flow controller 300 determines the air volume.

In detail, the method for controlling an air flow for a vehicle according to various embodiments of the present invention may further include a starting step (S100) that the air flow controller 300 generates a mode selection starting signal so as to enter the mode selecting step (S300).

In the starting step (S100), as illustrated in FIG. 2, in the case in which both of an air volume increase button signal and an air volume decrease button signal of the vehicle are generated in a set time range by the input portion 100, the mode selection starting signal may be generated by the air flow controller 300.

In order to perform the starting step (S100), a separate operation button may be provided in addition to an air volume button in the input portion 100, and various manipulation methods such as a method of pressing a set operation button for a set time in addition to a simultaneous manipulation of the air volume button may be used.

An intention of a driver to perform mode selection may be figured out through the starting step (S100) by the air flow controller 300, and a mode selection confirming step (S200) of controlling an air volume signal of an air volume display 500 to be turned on and off repeatedly at the time of the generation of the mode selection starting signal may be further performed by the air flow controller 300 so that the driver may confirm that he/she is to start the mode selecting step (S300).

In the mode selection confirming step (S200), the air volume signal is controlled to be repeatedly turned on and off to provide intuitive notification to the driver, thereby making it possible to allow the driver not to unintentionally perform the mode selecting step (S300).

In the mode selection confirming step (S200), in addition to controlling the air volume signal to be turned on and off repeatedly in the air volume display 500, various methods may be used to provide notification information to the driver.

Meanwhile, in the mode selecting step (S300), as described above, the plurality of discharging modes that are preset may be provided by the air flow controller 300. The plurality of discharging modes may include a first mode in which an air volume increase width has a constant gradient at the time of an increase in an air volume, a second mode in which an air volume increase width has a gradually increased gradient at the time of an increase in an air volume, and a third mode in which an air volume increase width has a gradually decreased gradient at the time of an increase in an air volume.

The first mode, which has a discharge pattern in which an air volume increase width is set to be always uniform as compared with the previous air volume stage as strength is increased in each air volume stage, as illustrated in FIG. 2, is a mode in which an air volume is increased in proportion to an increment.

On the other hand, the second mode, which has a discharge pattern in which an air volume increase width is gradually increased in a constant ratio as compared with the previous air volume stage at the time of an increase in an air volume, is not a mode in which an increment is uniform as in the first mode, but may be a mode in which an air volume is rapidly increased as the air volume becomes strong. In the second mode, since an increment in a low air volume stage is not large, an air flow may have a discharge pattern in which it is smoothly discharged, and an air volume in each stage may be set to be generally lower as compared with the first mode.

In addition, the third mode, which has a pattern in which an air volume increase width is gradually decreased as compared with the previous air volume stage at the time of an increase in an air volume, may be a mode in which an air volume increase width is large in a low air volume stage, but is decreased as progressing to a high air volume stage. Therefore, an air volume in each stage may be set to be generally higher as compared with the first mode.

In all of the first to third modes, air volumes in the lowest stage and the highest stage may be set to be the same as each other, and air volumes in stages between the lowest stage and the highest stage may be set to have a difference therebetween.

In each mode, air volumes of the lowest stage and the highest stage may also be set to be different from each other depending on an intention of a designer, and various discharging modes may be set depending on an intention of a designer, in addition to the above-mentioned modes.

In the mode selecting step (S300), the discharging modes may be sequentially selected when the air volume increase button signal or the air volume decrease button signal of the vehicle is applied, and when a set time elapses after the discharging mode is selected in the mode selecting step (S300), the selected discharging mode may be determined by the air flow controller 300.

Therefore, even though one discharging mode is set by manipulating an air volume increase or decrease button, in the case in which the discharging mode is changed by again pressing the air volume increase or decrease button within a set time, reselection may be performed.

After the mode selecting step (S300), an air volume resetting step (S400) that the input portion 100 receives input for resetting an air volume actually discharged in each air volume stage depending on the selected discharging mode may be further performed. Then, it is preferable that the air volume selecting step (S500) is performed so as to select an air volume stage having a desired magnitude.

Then, an air flowing step (S700) is performed by the air flow controller 300. In the air flowing step (S700), the air flow controller 300 controls a blower 700 so as to discharge air according to the determined discharging mode and the determined air volume.

According to the method for controlling an air flow for a vehicle having the structure as described above, a form, a type, and the like, of the discharged air flow may be set depending on a taste, in addition to simple selection of the air volume, thereby making it possible to improve salability.

Indoor pleasantness of the vehicle may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an air flow for a vehicle, comprising:
    mode selecting, that includes an input portion receiving an input for selecting at least any one of a plurality of discharging modes provided so as to select a discharge pattern of air discharged to the inside of the vehicle and an air flow controller determining the discharge mode; and
    air volume selecting, that includes the input portion receiving an input for selecting an air volume in the determined discharging mode after the discharging mode is determined and the air flow controller determining the air volume,
    wherein the plurality of discharging modes set in the mode selecting step includes a first mode in which an air volume increase width has a constant gradient as a time increases in an air volume, a second mode in which an air volume increase width has a gradually increased gradient as a time increases in an air volume, and a third mode in which an air volume increase width has a gradually decreased gradient as a time increases in an air volume,
    wherein the gradually increased gradient is a gradient having a greater gradient during a second time period than a gradient in a first time period which precedes the second time period,
    wherein the gradually decreased gradient is a gradient having a less gradient during the second time period than a gradient in the first time period which precedes the second time period, and
    wherein the constant gradient is a gradient having a same gradient during the second time period as a gradient in the first time period which precedes the second time period.

2. The method for controlling the air flow for the vehicle of claim 1, further comprising:
    starting, that includes the air flow controller generating a mode selection starting signal so as to enter the mode selecting step.

3. The method for controlling the air flow for the vehicle of claim 2, wherein in the starting, in a case in which both of an air volume increase button signal and an air volume decrease button signal of the input portion of the vehicle are generated in a set time range, the mode selection starting signal is generated by the air flow controller.

4. The method for controlling the air flow for the vehicle of claim 2, further comprising:
    mode selection confirming, that includes the air flow controller controlling an air volume signal of an air volume display to be turned on or off at a time of the generation of the mode selection starting signal.

5. The method for controlling the air flow for the vehicle of claim 1, wherein in the mode selecting, the discharging modes are sequentially selected when an air volume increase button signal or an air volume decrease button signal of the input portion of the vehicle is applied.

6. The method for controlling the air flow for the vehicle of claim 1, wherein when a set time elapses after the discharging mode is selected in the mode selecting, the selected discharging mode is determined by the air flow controller.

7. The method for controlling the air flow for the vehicle of claim 1, further comprising:
    air volume resetting, that includes the air flow controller resetting an air volume actually discharged in each air volume stage depending on the selected discharging mode.

* * * * *